2,844,630

NITROSATION PROCESS

William G. Johnson, Woodbury, N. J., and William H. Reedy, Jr., Wilmington, Del., assignors to E. I. du Pont de Nemours and Company, Wilmington, Del., a corporation of Delaware No Drawing. Application December 1, 1955
Serial No. 550,456

3 Claims. (Cl. 260—566)

The present invention relates to a process for the nitrosation of organic compounds and especially of ketones and substituted ketones. More particularly the present invention relates to a process for the nitrosation of ketonic compounds at the carbon atom alpha to a ketonic carbonyl.

It is an object of the present invention to provide a process for nitrosating ketones, diketones, alphahalo ketones, alicyclic ketones, beta-keto esters, and kindred compounds which is safe, convenient, and economical. It is a further object of the present invention to provide a method for nitrosating organic compositions containing a ketonic carbonyl which will accomplish higher yields than any prior art nitrosation technique.

The nitrosation process of the present invention is particularly satisfactory for the preparation of oximes which are useful as organic intermediates in the preparation of a wide variety of organic compounds, including amines, amino acids, diamines, and amino alcohols. Biacetyl monoxime is an intermediate in the preparation of dimethylglyoxime and diacetyl, a flavoring ingredient.

According to the present invention, nitrosation is accomplished by passing nitric oxide and air into the ketonic composition in the presence of catalytic amounts of hydrochloric acid. After the addition period, the catalyst is neutralized and the mixture is filtered, concentrated, and centrifuged to recover the solid product.

A more complete understanding of the invention may be gained by a consideration of the following examples.

Example 1

1.0 ml. of concentrated hydrochloric acid (38%) was added to 4 moles (232.5 grams) of acetone. 0.5 mole of nitric oxide and 0.89 mole of air were then metered in with vigorous stirring through separate inlet tubes equipped with glass gas-sparger tips at points well below the surface of the acetone. The addition of the nitric oxide and air was spaced over one hour during which time the temperature was held at 15° C. by cooling with ice. The hydrochloric acid catalyst was then neutralized with calcium carbonate and, after filtration, the reaction mixture was concentrated to apparent dryness at reduced pressure. Subsequent centrifugation of the product yielded 32.6 grams of white oximinoacetone having a purity of 96.7% as established by titration with dilute alkali. The net yield was 72.5% of the theoretical based on the nitric oxide.

Example 2

The procedure of Example 1 was repeated using ten times the quantity of reactants and the same reaction time of one hour. The yield of oximinoacetone was 347 grams of 93.8% purity. The net yield of pure oximinoacetone (325 grams) was 75% of the theoretical based on the nitric oxide.

Example 3

The procedure of Example 1 was repeated using 0.6 ml. of hydrochloric acid and a temperature of 30° C. 29.5 grams of 97% pure oximinoacetone were obtained, representing a net yield of 66% of the theoretical based on the nitric oxide.

Example 4

5.0 ml. of concentrated hydrochloric acid (38%) were added to 3.2 moles (230.4 grams) of methyl ethyl ketone. The mixture was then treated according to the procedure of Example 1. The temperature during the addition period was maintained between 35 and 40° C. The product obtained was 135 grams of biacetyl monoxime (melting point 74–75° C.), representing a yield of 67% of the theoretical based on the nitric oxide.

Example 5

Ethyl acetoacetate (300 grams, 2.3 moles) containing 5.0 ml. hydrochloric acid was treated according to Example 1 with 2 moles nitric oxide and 3.2 moles air over a 1-hour period. After neutralization and concentration the yield (based on hydrogenation data of the crude reaction mixture) of α-oximinoacetoacetic ester was 75%.

Example 6

Cyclohexanone (196 grams, 2 moles) containing 10.0 ml. hydrochloric acid was treated according to Example 1 with 1.1 moles nitric oxide and 2.0 moles air during 33 minutes. The mixture thickened and turned brown. Filtration yielded 21.4 grams brownish-white solid. This material was suspended in acetone and filtered. There was obtained 14.3 grams of 1,3-dioximinocyclohexanone (melting point above 200° with decomposition). This compound was characterized by its reaction with o-phenylenediamine to form the corresponding phenazine derivative.

Example 7

Acetylacetone (250 grams, 2.5 moles) containing 5.0 ml. hydrochloric acid was treated according to Example 1 with 2 moles nitric oxide and 3.5 moles air over a 1-hour period at 20° C. After neutralization, filtration and cooling, 94 grams of oximinoacetylacetone (melting point 75–76°) was obtained. An additional 16.3 grams of material (melting point 74–75°) was recovered from the filtrate (42.7% yield based on the nitric oxide).

Example 8

Chloroacetone (370 grams, 4.0 moles) containing 3.0 ml. hydrochloric acid was treated according to Example 1 with 0.5 mole nitric oxide and 0.89 mole air over a 1-hour period. After neutralization and evaporation of excess chloroacetone, 27.2 grams of α-chloro-α-oximinoacetone (melting point 106–7°) was isolated (44.7% yield based on nitric oxide).

Example 9

Acetophenone (60 grams, 0.5 mole) was dissolved in 250 ml. benzene containing 10 ml. hydrochloric acid and cooled to 15° C. 0.5 mole nitric oxide and 0.86 mole air were added over a 30-minute period. After neutralization, the mixture was extracted with 10% aqueous sodium hydroxide. Acidification of the aqueous extract yielded a small amount of α-oximinoacetophenone, melting point 124–5°.

Example 10

Deoxybenzoin (38 grams, 0.19 mole) was dissolved in 250 ml. benzene and treated according to Example 9 with 0.2 mole nitric oxide and 0.33 mole air over a 30-minute period. There was obtained 1.2 grams (2.7% yield based on nitric oxide) of benzilmonoxime, melting point 119–120° C.

Example 11

The present invention is easily adapted as a continuous process. 12,970 grams (223.62 moles) of acetone was fed into a packed tower over a period of 5 hours. Concentrated aqueous hydrochloric acid (36.5–38% was continuously fed in at a rate of 0.8 gram per minute. There was simultaneously added nitric oxide at a flow rate of 3,000 cc. per minute, air at a flow rate of 5900 cc. per minute, and nitrogen at a flow rate of 3,000 cc. per minute. The overall composition of the gas mixture was 25.2% nitric oxide, 9.9% oxygen, and 64.9% nitrogen. The temperature was maintained at 25° C. throughout. During the 5-hour reaction period, 13,440 grams of a reaction mixture was collected, containing 21.86% α-oximinoacetone, 2.21% hydrochloric acid, and 5.55% water. The conversion of nitric oxide to α-oximinoacetone in the reaction mixture was 95%.

The reaction mixture was evaporated in an evaporator below 0° C. until the α-oximinoacetone concentration was 29.74%. 2,090 grams of this solution, containing 622 grams of α-oximinoacetone was further concentrated in a spray column. The liquid was sprayed at a liquid temperature of −10° C. and an air temperature of 25–30° C. at an air flow rate less than 0.5 ft./sec. A total of 1160 grams of mixture was collected containing 51.36% α-oximinoacetone. During the spraying operation 22 grams of product was sublimed, but is recoverable when the air is recycled in the continuous process.

The solution from the spray concentrator was crystallized overnight and centrifuged below −40° C. 395 grams of α-oximinoacetone crystals (91.33% purity) was collected (361 grams of 100% purity). The filtrate was resprayed, crystallized, and centrifuged again under the same conditions and 180 grams of 90.6% purity was isolated (163 grams of 100% purity). In two concentrations, 524 grams (100% purity) or 84.3% of the α-oximinoacetone was obtained. In a third concentration an additional 45 grams of α-oximinoacetone (approximately 90% purity) was collected.

The temperature of reaction during the addition period may vary anywhere from about 0° C. to 50° C., but is preferably within 15–25° C. When the reaction is performed in the higher regions of the specified temperature range, less hydrochloric acid is required to catalyze the reaction, but yields are slightly lower.

The time of addition of nitric oxide and air is not critical, but it is preferable to admit the gases by separate inlets into the ketone in order to minimize nitrogen dioxide formation and thus obtain a purer product. Prior mixing of the nitric oxide and air is permissible provided that the time lapse between mixing and addition to the ketone is in the order of five seconds or less.

Air is preferred as the source of oxygen since it is desirable to have the nitrogen of the air present as a diluent. Oxygen-enriched air and pure oxygen are operable but are somewhat more hazardous than plain air.

While calcium carbonate has been illustrated in all the examples as the neutralizing agent for the acid, other alkaline materials such as gaseous or aqueous ammonia may also be used.

The process of the present invention is operable over a wide range of reactant proportions. However, as might be expected, optimum yields of the oxime may be obtained from the corresponding ketonic composition if the reactant proportions are maintained within certain limitations.

In the case of α-oximinoacetone, best results are achieved with the batch operation if the acetone-to-nitric oxide mole ratio is maintained between about 6/1 and 8/1. The corresponding figures for the continuous process are an acetone/nitric oxide mole ratio in the range of about 5/1 to 7/1. 0.1/5.0 cc. of the hydrochloric acid catalyst (36.5 to 38%) per mole of acetone may be used, but amounts in the range of 0.20 to 0.50 cc. are preferred. These figures correspond to mole ratio ranges (hydrochloric acid/acetone) of 0.0012/1 to 0.06/1 and 0.003/1 to 0.006/1, respectively.

It will be readily understood that the preferred operating reactant ratios will vary considerably with the specific reagents involved and the particular product desired. The ranges listed above have been found particularly suitable for the preparation of α-oximinoacetone from acetone by the present process.

The present process offers a direct method for nitrosating organic ketonic compositions wherein the carbon atom to be nitrosated is alpha to the ketonic carbonyl without isolation and purification of intermediate compositions. A product of high purity is obtained in significant yields.

Having thus described our invention, we intend to be limited only by the following claims.

We claim:

1. A process for the nitrosation of an organic compound containing a ketonic carbonyl alpha to an activated methylene group which is to be nitrosated, comprising contacting the compound with nitric oxide and air in the presence of catalytic amounts of hydrochloric acid at a temperature in the range of about 0° C. to about 50° C.

2. A process as in claim 1 which is operated continuously.

3. A process for the preparation of α-oximinoacetone, comprising contacting acetone with nitric oxide and air in the presence of catalytic amounts of hydrochloric acid at a temperature of about 0°–50° C.

References Cited in the file of this patent

UNITED STATES PATENTS 2,731,499    Coraor                 Jan. 17, 1956
2,749,358    Reilly                  June 5, 1956

OTHER REFERENCES

Winkler: Ber., vol. 34, p. 1412 (1901).
Johnston et al.: J. A. Chem. Soc., vol. 51, 3195 (1929).